United States Patent [19]

Weideman

[11] Patent Number: 5,133,022

[45] Date of Patent: Jul. 21, 1992

[54] NORMALIZING CORRELATOR FOR VIDEO PROCESSING

[75] Inventor: William E. Weideman, Arlington, Tex.

[73] Assignee: Recognition Equipment Incorporated, Irving, Tex.

[21] Appl. No.: 651,208

[22] Filed: Feb. 6, 1991

[51] Int. Cl.⁵ .............................................. G06K 9/46
[52] U.S. Cl. ..................................... 382/18; 358/447; 358/466; 382/50; 382/51; 382/54
[58] Field of Search ....................... 382/50, 51, 52, 53, 382/54, 56, 18, 27; 358/163, 166, 447, 461, 465, 466, 464

[56] References Cited

U.S. PATENT DOCUMENTS

| | | | |
|---|---|---|---|
| 3,761,876 | 9/1973 | Flaherty et al. | 340/146.3 |
| 4,162,481 | 7/1979 | DuVall | 382/52 |
| 4,411,015 | 10/1983 | Scherl et al. | 382/51 |
| 4,675,909 | 6/1987 | Egami et al. | 382/50 |
| 4,695,884 | 9/1987 | Anastassiou et al. | 382/51 |
| 4,741,046 | 4/1988 | Matsunawa et al. | 382/51 |
| 4,788,598 | 11/1988 | Och et al. | 382/56 |
| 4,791,678 | 12/1988 | Iwase et al. | 382/51 |
| 4,887,305 | 12/1989 | Shimura | 382/51 |
| 4,950,894 | 8/1990 | Hara et al. | 382/18 |
| 4,975,970 | 12/1990 | Zeltel et al. | 382/18 |

Primary Examiner—Joseph Mancuso
Attorney, Agent, or Firm—Ross, Howison, Clapp & Korn

[57] ABSTRACT

A video image processor for generating an enhanced image of data based upon input gray scale picture element values of image data of a document background and printed information contained thereon generates a histogram of the gray scale picture element values for each tile of image data for an area of the document representing the frequency of occurrence of picture elements of a particular gray scale value. A correlator processes each histogram to determine a back reference level and a white reference level for each tile. Normalization factors are calculated based upon the black reference level and the white reference level. The input gray scale picture element values for each tile of the image data associated with the normalization factors of each tile are normalized based upon the normalization factors for each tile and correlated to generate a normalized and correlated representation of the image data.

3 Claims, 1 Drawing Sheet

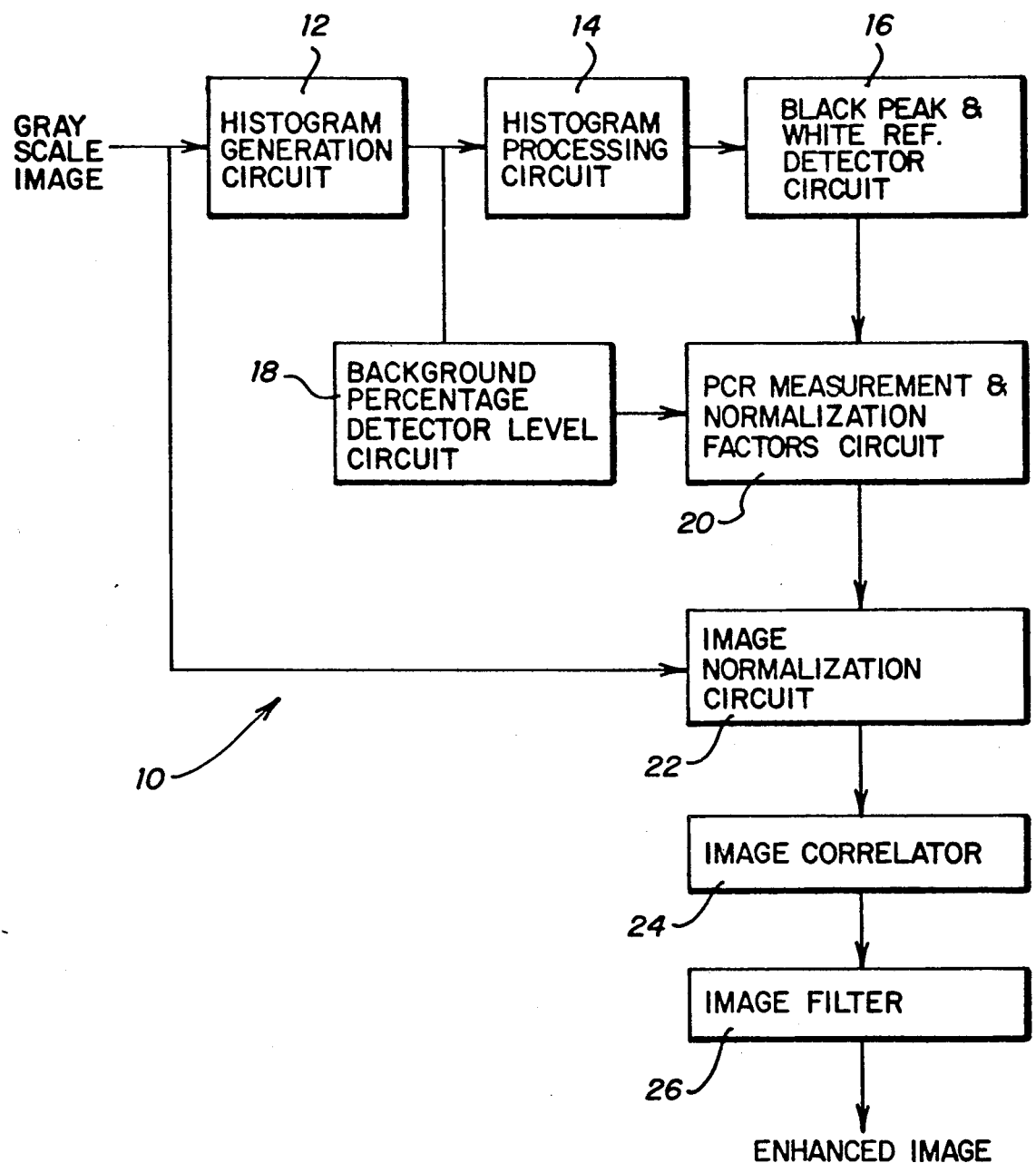

NORMALIZING CORRELATOR FOR VIDEO PROCESSING

TECHNICAL FIELD OF THE INVENTION

This invention relates to optical character recognition systems, and more particularly to a normalizing correlator for processing video images.

BACKGROUND OF THE INVENTION

In optical character recognition systems, video image information is reduced to a black/white decision from multi-level gray scale information before character recognition can be accomplished. The performance of any character recognition technique is dependent upon the quality of the video information being processed. The technique for reducing multi-level image information to black/white decisions determines, in part, the quality of the video image. One such technique for data reduction to black/white images is referred to as correlation. Correlation techniques include those described in U.S. Pat. Nos. 3,761,876 and 4,162,481.

In processing carbon, or carbonless, copies of an original document such as, for example, credit card receipt documents, many image scanning devices cannot produce a high quality image to capture all information on the document. Since the contrast of the carbon on the background is very low, standard thresholding techniques for image processing fail to produce an image of acceptable quality. Additional imaging problems occur due to noise, including smudges, stray matter and inherent non-uniform characteristics of the paper. Therefore, existing correlation techniques are inadequate for the processing of video images where print contrast ratios are low.

A need has thus arisen for a video processing system to enable optical character recognition devices to be able to read multi-level gray scale information from a variety of documents and forms and where such information is printed on non-white documents and/or documents having noisy backgrounds. Additionally, a need has arisen for a video processing system which will enable optical character recognition devices to read light characters that are typically not imaged correctly by standard image scanners.

SUMMARY OF THE INVENTION

In accordance with the present invention, a video image processor for generating an enhanced image of data based upon input gray scale picture element values of image data of a document background and printed information contained thereon is provided. The processor generates histograms of the gray scale picture element values of image data for each tile in an area of the document representing the frequency of occurrence of picture elements of a particular gray scale value. A correlator processes each histogram to determine a black reference level and a white reference level for each tile. Normalization factors are calculated based upon the black reference level and the white reference level. The input gray scale picture element values for each tile of the image data associated with the normalization factors for each tile are normalized based upon the normalization factors for each tile and correlated to generate a normalized and correlated representation of the image data.

BRIEF DESCRIPTION OF THE DRAWING

For a more complete understanding of the present invention and for further advantages thereof, reference is now made to the following Description of the Preferred Embodiments taken in conjunction with the accompanying Drawing which is a block diagram of the present video image processor.

DESCRIPTION OF THE PREFERRED EMBODIMENTS

Referring to the FIGURE, a block diagram of the present video image processor is illustrated, and is generally identified by the numeral 10. Processor 10 functions to convert gray scale image data to a black/white image which may be used, for example, for reading by an optical character recognition device. The present processor includes a normalizing correlator for normalization of the image to fill the entire dynamic range for areas or tiles of the image. As used herein, a "tile" refers to a portion of an area within a document. Background detection circuitry is utilized in addition to black detection circuitry. Gray scale image data in the form of picture element (pixel) values are applied to a histogram generation circuit 12. Histogram generation circuit 12 functions to generate a histogram of the gray scale picture element values of the image data for each tile of the document. The histogram represents the frequency of occurrence of picture elements of a particular gray scale value.

The output of histogram generation circuit 12 is applied to a histogram processing circuit 14 which functions to extract the significant peaks of the histogram by generating, for example, a second derivative or a smoothed Laplacian of the histogram data. The histogram data representing counts of picture elements of a particular gray scale value is converted to a positive and negative going signal through a smoothed Laplacian technique. The positive peaks of the processed histogram correspond to the significant peaks of the original histogram data.

The black peak and a white reference is detected by detector circuit 16 which receives the output of histogram processing circuit 14. The white reference level is selected as being the gray scale value corresponding to the first zero after the white peak. The black peak is the gray scale value having the largest positive number detected at the black end of the histogram scale.

The output of histogram generation circuit 12 is also applied to a background percentage level detector circuit 18 which determines the gray scale value of the picture elements in a tile that have a predetermined percentage of picture elements in the tile which are lighter than the determined gray scale value. A background percentage level indicates which gray scale values in the tile corresponds to the background in the image indicating the amount of the image that is background.

The output of black peak and white reference detector circuit 16 and the background percentage level detector circuit 18 is applied to a print contrast ratio (PCR) measurement and normalization factors circuit 20. Measurement of the print contrast ratio ensures that the background percentage level is not too dark. Normalization factors are determined through a set of rules based upon the print contrast ratio and the black peak level. These normalization factors include a multiplication scale factor and a subtractor.

The normalization factors are determined utilizing the following rules:

1. If the background percentage level is less that the dark background threshold, then: make the subtractor equal the background percentage level;

Else, if PCR is sufficient, then: make the subtractor equal to the average of the background percentage level and the white level;

Else, if the average of the background percentage level and the white level is greater than the dark background threshold, then:

make the subtractor equal the previous subtractor.

2. If the PCR is insufficient and the background percentage level is less than the dark background threshold, then:

make the multiplication scale factor equal 255/(previous black peak-subtractor);

Else, make the multiplication scale factor equal 255/(black peak-subtractor).

The normalization factors are then used to scale the picture elements of the tile at block 22. These factors are utilized to normalize the picture elements in the tile, such that by using the subtractor factor, the picture element lighter than the background level is forced to white, and by using the multiplication scale factor, the black picture elements are forced to the highest black level or to the full dynamic range of the gray scale level values. The output of image normalization circuit 22 represents an enhanced image of the original gray scale image. The enhanced image is the same size as the original gray scale image and is not broken up into tiles.

The output of image normalization circuit 22 is further enhanced and applied to an image correlator 24, which functions as a standard correlator, such as described in U.S. Pat. Nos. 3,761,876 and/or 4,162,481, the descriptions of which are hereby incorporated by reference. Additionally, correlator 24 may function as a multibit correlator.

The output of image correlator circuit 24 is applied to an image filter 26 which functions as a spot filter to remove single picture elements spots or small spots appearing within the image. The output of image filter 26 represents a normalized and correlated enhanced image of the gray scale image data which may be applied to an optical character recognition device for character recognition. Additionally, the output of image filter 26 may be applied to a video display terminal to provide an enhanced image of a document to an operator at a work station.

The size of the tiles processed, correlator area sum and the spots removed by image filter 26 are dependent on the sample density of the image. For a sample density of 300 picture elements per inch, a tile size of 65 picture elements with a 50% overlap may be utilized. Additionally, a 9 by 9 correlator area sum and a spot filter to remove four picture element spots and voids may be utilized.

It therefore can be seen that the present invention functions to perform both normalization and correlation of a gray scale image such that the image fills the entire desired dynamic range to generate an enhanced image.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A processor for generating an enhanced image of data based upon input gray scale pixel values of image data of a document background and printed information contained thereon, the gray scale pixel values having a maximum black pixel value and a maximum white pixel value, the processor comprising:

means for dividing the image data into a plurality of tiles, each of said tiles representing an area of the image;

means for generating a histogram of the gray scale pixel values of image data for each of said tiles of the image representing the frequency of occurrence of pixels of a particular gray scale pixel value;

means for processing said histogram to determine a background level;

means for processing said histogram to generate a processed histogram for each of said tiles;

means for determining a black reference level in each of said tiles based upon said processed histogram;

means for determining a white peak level and a print contrast ratio in each of said tiles based upon said processed historgram;

means for dynamically selecting said background level and said white peak level to determine a white reference level based upon said black reference level, said print contrast ratio, said background level, and said white peak level in each of said tiles;

means for calculating normalization factors based upon said black reference level and said white reference level for each of said tiles;

means for normalizing each of the input gray scale pixel values of the image data associated with the appropriate normalization factors of each of said tiles based upon said normalization factors to generate normalized pixel values representative of the image data for each of said tiles, such that input gray scale pixel values blacker than said black reference level are forced to the maximum black pixel value, and input gray scale pixel values whiter than said white reference level are forced to the maximum white pixel value, and all other input gray scale pixel values are linearly scaled to a value between the maximum white pixel value and the maximum black pixel value; and means for correlating within each of said tiles said normalized pixel values representative of the image data by comparing each of said normalized pixel values and a group of normalized pixel values against a correlation curve to generate a correlated image.

2. The processor of claim 1 and further including: means for producing pixel values of said correlated image based upon the comparison of said normalized pixel values and an area sum of normalized pixel values against a correlation curve.

3. The processor of claim 1 and further including: means for producing a gray scale image based upon the comparison of said normalized pixel values and an area sum of normalized pixel values against multiple correlation curves to determine the gray scale value of the pixel value in said correlated image.

* * * * *